United States Patent [19]

Rossio

[11] 4,171,044

[45] * Oct. 16, 1979

[54] INCLINED BELT CONVEYOR

[75] Inventor: John H. Rossio, Kalamazoo, Mich.

[73] Assignee: LaRos Equipment Company, Inc., Portage, Mich.

[*] Notice: The portion of the term of this patent subsequent to Sep. 27, 1994, has been disclaimed.

[21] Appl. No.: 835,873

[22] Filed: Sep. 23, 1977

Related U.S. Application Data

[63] Continuation-in-part of Ser. No. 666,343, Mar. 12, 1976, Pat. No. 4,050,575.

[51] Int. Cl.² .............................................. B65G 23/06
[52] U.S. Cl. ..................................... 198/834; 198/841
[58] Field of Search ............... 198/393, 396, 397, 607, 198/804, 832, 834, 835, 854, 616, 688, 840, 841, 860

[56] References Cited

U.S. PATENT DOCUMENTS

| | | | |
|---|---|---|---|
| 1,625,070 | 4/1927 | Bailey | 198/688 |
| 2,393,563 | 1/1946 | Petterson | 198/854 |
| 3,326,355 | 6/1967 | Phillips | 198/835 |
| 3,750,904 | 8/1973 | Wisler | 198/835 |
| 3,835,985 | 9/1974 | Johnson | 198/397 |
| 4,050,575 | 9/1977 | Rossio | 198/834 |

*Primary Examiner*—Richard A. Schacher
*Attorney, Agent, or Firm*—Blanchard, Flynn, Thiel, Boutell & Tanis

[57] ABSTRACT

A belt-type conveyor having an endless belt supported on a pair of spaced end rollers. The upper reach of the belt is adapted to have articles supported thereon for transporting thereof. A drive system is interconnected to both end rollers to simultaneously rotatably drive same, which end rollers in turn drive the belt. This drive system permits the upper reach of the belt to be maintained relatively free of tension so that the upper reach will readily conform to a guide structure which is positioned thereunder for slidably supporting same. The conveyor is particularly suitable for use as an inclined conveyor to permit lifting of articles on the upper belt reach, which upper reach can be bent upwardly from a horizontal position without requiring top guide rails or other hold-down devices.

8 Claims, 5 Drawing Figures

INCLINED BELT CONVEYOR

CROSS-REFERENCE TO RELATED APPLICATION

This is a continuation-in-part of my copending application Ser. No. 666 343 filed Mar. 12, 1976, now U.S. Pat. No. 4,050,575.

FIELD OF THE INVENTION

This invention relates to an improved belt-type conveyor and, in particular, a conveyor suitable for use as an inclined conveyor.

BACKGROUND OF THE INVENTION

Belt-type conveyors are utilized extensively for transferring articles or objects from one station to another. In such conveyors, there is normally provided an endless belt trained around a pair of end rollers, with additional intermediate idler or tensioning rollers also being provided. The upper reach of the belt is normally utilized for supporting the articles being transferred. In some conveyors, normally referred to as horizontal belt conveyors, the upper belt reach extends substantially horizontally and thus merely transfers the objects between two different horizontally spaced stations. Other conveyors, normally referred to as inclined conveyors, have at least a part of the upper belt reach extending upwardly at an angle with respect to the horizontal so as to permit a vertical lifting of the articles as they are transported between two working stations.

In these known conveyors, the drive is normally connected to only one of the end rollers so that the belt is thus under a substantial tension in order to effect operation of the conveyor. Because of the tension in the belt, it is necessary for the conveyor to be provided with complex alignment structure, associated wih both the belt and the roller, so as to permit proper tracking of the belt. If the rollers and belts are not properly aligned, then the tension in the belt causes the belts to continually move sidewardly of the rollers so that the side edges of the belt rub against the guide structure, thereby resulting in excessive wear. The tension in the belt thus makes the overall conveyor more complex by requiring costly alignment structure, and additionally makes setup and operation more difficult in view of the necessity of having this structure precisely adjusted. Since this is difficult to accomplish, undesirable wear of the belt is normally encountered during usual operation of such conveyors.

In addition to the above problems, belt conveyors of the inclined type possess still further structural and operational disadvantages. Particularly, in inclined conveyors wherein the upper belt reach has a portion projecting horizontally and a further portion inclined upwardly, it is necessary to provide guide structure throughout the curve (the junction between the horizontal and inclined portions) in order to maintain the desired curvature of the upper belt reach. Absent this guide structure, which normally comprises guide rails disposed for engagement with the upper side edges of the belt, the proper curvature of the belt cannot be maintained in view of the large tension which exists in the belt. The use of these top guide rails is, however, undesirable in view of the excessive rubbing and wear which they cause on the belt. In addition to the top guide rails, it has also often been necessary to provide an additional control roller at the curve in order to maintain the belt in the desired path, but this control roller greatly restricts the applicability of the conveyor for many uses.

Because of the excessive belt tension required in these known belt conveyors, a problem of bowing of the belt across the width thereof has also been experienced. To overcome this problem, it has been conventional to provide cross rails on the belt so as to strengthen same and prevent bowing. This not only increases the cost and complexity of the belt, but also increases the complexity of driving and controlling the belt.

Accordingly, it is an object of the present invention to provide an improved inclined belt conveyor which overcomes the above-mentioned disadvantages. More specifically, the belt conveyor of this invention includes a drive arrangement which is connected to and simultaneously drives both of the end rollers which support the belt so that the belt is maintained with little, if any, tension therein during operation of the system.

Another object of this invention is to provide an improved belt conveyor, as aforesaid, which minimizes the problem of belt tracking and excessive belt wear, and which also eliminates the need for complex and costly alignment structure due to the belt being maintained in a condition wherein it is substantially free of tension.

Still another object of this invention is the provision of a belt conveyor, as aforesaid, wherein the upper belt reach can be deflected from a horizontal position into an upwardly inclined position without requiring any top guide rails or other top control rollers at or throughout the curve between the horizontal and inclined portions of the belt.

A further object of this invention is an improved belt conveyor, as aforesaid, which is simple to manufacture and assemble, which is of minimum cost and mechanical complexity, which operates in an efficient manner while requiring minimum adjustment and maintenance, which is suitable for use as either a horizontal or inclined conveyor, and which permits the use of either a friction or a toothed drive between the rollers and belt depending upon the magnitude of the transported load and/or the angle of inclination.

In the belt conveyor of this invention, the belt extends between a pair of end rollers which support the upper reach of the belt so that a part of this upper reach is inclined upwardly. The pair of end rollers are simultaneously driven from a common drive source so that the upper belt reach is maintained in a virtually tensionless condition. The upper reach of the belt, at least that portion thereof which is inclined, is supported on guide members positioned beneath the upper reach, and the curved portion of the upper reach is free of any guiding support. A toothed driving arrangement can be provided between the rollers and the belt to prevent slippage therebetween, which toothed drive arrangement additionally functions as an alignment structure to ensure proper alignment of the belt on the rollers.

Other objects and purposes of this invention will be apparent to persons familiar with structures of this type upon reading the following specification and inspecting the accompanying drawings.

Figures 1, 2, 3:
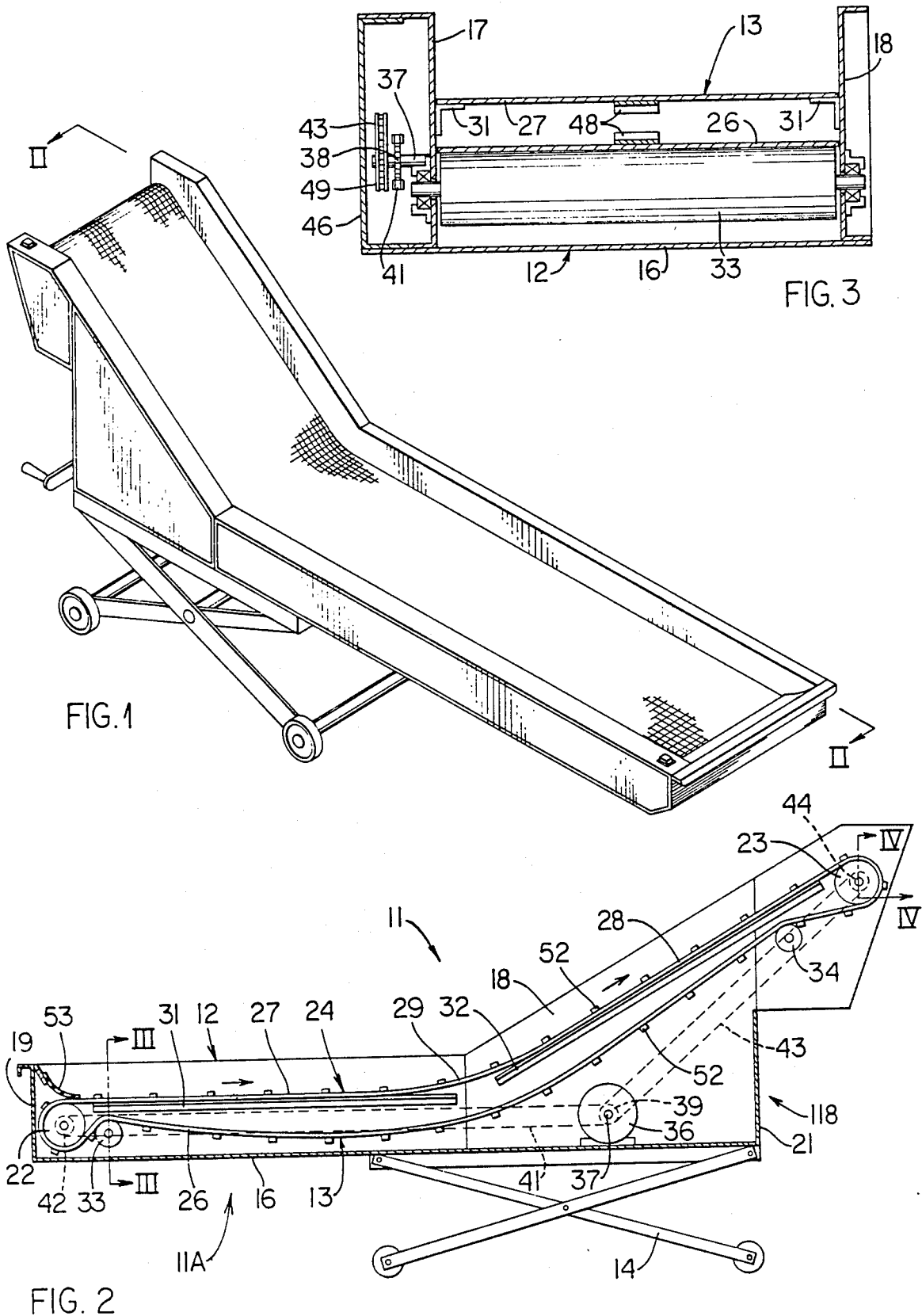
FIG. 1 is a perspective view of an inclined conveyor according to the present invention.
FIG. 2 is a side elevational view taken along the line II—II in FIG. 1.
FIG. 3 is an enlarged, fragmentary sectional view taken along line III—III in FIG. 2.

Certain terminology will be used in the following description for convenience in reference only and will not be limiting.

For example, the words "upwardly", "downwardly", "leftwardly" and "rightwardly" refer to directions in the drawings to which reference is made. The word "forwardly" refers to the normal direction of movement of articles by the conveyor belt, which movement occurs from left to right in FIGS. 2 and 5. The words "inwardly" and "outwardly" refer to directions toward and away from, respectively, the geometric center of the conveyor and designated parts thereof. Said terminology includes the words specifically mentioned, derivatives thereof and words of similar import.

DETAILED DESCRIPTION

FIGS. 1 and 2 illustrate a belt conveyor 11 which includes a horizontal conveyor section 11A and an inclined conveyor section 11B. The conveyor 11 has a housing 12 on which is supported an endless conveyor belt 13. The housing is, in the illustrated embodiment, supported on an adjustable scissor lift 14 so that the conveyor position can be selectively adjusted.

Housing 12 is of an upwardly opening boxlike configuration and includes a bottom wall 16 and upwardly projecting parallel sidewalls 17 and 18. The opposite ends of the housing are closed by front wall 19 and rear wall 21.

The endless belt 13 extends between a pair of axially elongated cylindrical end rollers 22 and 23, which rollers extend between sidewalls 17 and 18 and are rotatably supported thereon, as by conventional bearings. End rollers 22 and 23 are disposed with their axes extending in parallel horizontal relationship. Belt 13 has upper and lower belt reaches 24 and 26, respectively, which reaches extend between the rollers 22 and 23. The upper belt reach 24 includes a horizontal belt portion 27 which is adjacent the inlet end of the conveyor, an inclined belt portion 28 which is at the discharge end of the conveyor, and an intermediate curved belt portion 29 which joins the portions 27 and 28.

The horizontal belt portion 27 is slidably supported on a pair of horizontally elongated guide rails 31 which, as shown in FIG. 3, are of an L-shaped configuration and are fixed to the sidewalls 17 and 18. The inclined belt portion 28 is similarly slidably supported by a pair of elongated guide rails 32 which are inclined upwardly at the desired inclination. The guide rails 32 are also of an L-shaped cross section and are fixedly secured to the opposite sidewalls 17 and 18.

As described above, the upper left reach 24 is supported solely by guide rails 31 and 32 which slidably engage the underside of the belt. Thus, the complete upper reach 24 does not have any guide structure disposed in engagement with the upper surface thereof, and in fact the curved belt portion 29 is free of any guiding support.

Lower belt reach 26 is maintained in a curved configuration which results from the belt being maintained in a suspended condition over a major portion of the length thereof. However, cylindrical idler rollers 33 and 34 are rotatably supported on the housing sidewalls and are positioned for engaging the lower belt reach. Rollers 33 and 34 are disposed closely adjacent the end rollers 22 and 23, respectively, whereby they ensure that the belt extends around the end rollers and is driven by a motor 36, such as an electric motor.

The motor 36 is positioned within the housing, as by being mounted on the bottom wall 16 beneath the inclined portion of the belt. Motor 36 has the shaft 37 thereof projecting outwardly from one side of the housing. Shaft 37 has drive sprockets 38 and 39 fixedly secured thereto. Drive sprocket 38 is in driving engagement wih a first chain 41, which in turn is engaged with a driven sprocket 42, the latter being nonrotatably secured to the shaft of end roller 22. A second chain 43 is in engagement with the other drive sprocket 39, which chain 43 is engaged with a driven sprocket 44 which is nonrotatably secured to the end roller 23. In this embodiment, the sprockets 38 and 39 are of identical diameters, and the sprockets 42 and 44 are also of equal diameter, whereby the motor 36 causes simultaneous driving of the two end rollers 22 and 23, which end rollers are also of equal diameter and are thus driven with equal peripheral speeds.

The drive structure, namely the sprockets and the chains, are positioned adjacent but exteriorly of the sidewall 17. They are enclosed within a suitable cover or shroud 46 which is fixedly secured to the sidewall 17.

To ensure that end rollers 22 and 23 both cause a simultaneous driving of the belt 13, and to positively prevent slippage of the belt on either of the end rollers, the belt is driven from rollers 22 and 23 by means of a toothed driving connection which includes a drive gear 47 (FIG. 4) fixedly associated with each of the end rollers 22 and 23. This drive gear is maintained in meshing engagement with a toothed gear rack 48 which is fixed to and extends throughout the length of the belt 13.

Figure 4:
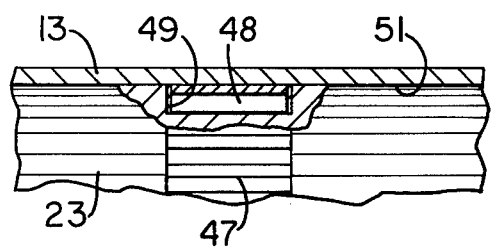
FIG. 4 is an enlarged, fragmentary sectional view taken along line IV—IV in FIG. 2.

In the illustrated embodiment, as shown in FIG. 4, each roller 22 and 23 has an annular recess 49 formed therein, and the bottom of this recess 48 has teeth formed thereon, which teeth form the drive gear 47. The gear rack 48 projects downwardly from the undersurface 51 of the belt and projects into the recess 49 so as to meshingly engage the drive gear 47. This construction not only provides a positive driving connection between the belt 13 and each of the rollers 22 and 23, but it also provides an effective alignment structure which prevents the belt from slipping or moving sidewardly with respect to the rollers 22 and 23. This structure thus ensures that the belt tracks properly over the rollers and does not move sidewardly so as to unduly rub against the housing sidewalls.

While a positive (for example, a toothed) driving connection between the belt 13 and the rollers 22 and 23 is preferred so as to positively prevent slippage between the belt and the rollers, nevertheless such a positive driving connection is not necessary under all conditions of use. For example, where relatively light loads are imposed on the conveyor, then the teeth can be eliminated and a friction drive relied upon for driving the belt from the end rollers.

The belt 13 is also preferably provided with elongated rod-like cleats 52 fixed to the outer surface thereof, which cleats extend transversely across a major portion of the belt width. These cleats assist in holding the objects in position on the belt as it moves upwardly. Depending on the type of usage, the angle of inclination, and the nature of goods being transported, the use of such cleats is optional.

As shown in FIG. 1, a deflector 53 in the form of a resilient plate is secured to the housing across the inlet end thereof, which plate projects downwardly and engages the upper surface of the belt in the vicinity of the end roller 22. Deflector 53 prevents articles which are deposited onto the belt from falling downwardly between the end roller and the housing.

OPERATION

In operation, articles or objects are deposited onto the horizontal belt portion 27. The belt 13 is driven from motor 36, whereupon the belt 13 moves in the direction of the arrows so that the articles are carried rightwardly to the curved portion 29 and then upwardly along the inclined portion 28 until reaching the upper end roller 23. The articles are then discharged from the conveyor, as by being deposited into any other suitable apparatus, such as into a bin or onto a further conveyor.

During driving of belt 13, the motor 36 drives both end rollers 22 and 23 in the same rotational direction at the same peripheral speed due to the dual driving connections provided by chains 41 and 43. Since substantially equal driving forces are imposed on belt 13 adjacent the opposite ends thereof, which forces are provided by the rollers 22 and 23, the upper belt reach 24 is substantially free of tension as caused by the driving forces. While it is obviously impossible to have zero tension in the belt, since some tension will occur due to the effect of gravity, nevertheless the tension in the upper belt reach is maintained at an absolute minimum. This lack of tension enables the belt to track freely on the rollers without encountering any substantial problem of misalignment. Further, even if the belt does not track in a straight manner, nevertheless the low tension in the belt minimizes the wear of the belt and prevents any undue wear of the belt due to the edges thereof rubbing against the sidewalls. Even this problem of belt tracking is substantially eliminated, however, when the conveyor is provided with the toothed guiding connection formed by the gear 47 and gear rack 48.

Due to the substantial absence of tension in the upper reach of the belt, the upper reach can be guided solely by the guide rails 31 and 32 which engage the undersurface of the horizontal and inclined portions of the belt, respectively. The upper surface of the belt, in the upper reach thereof, is totally free of any guide rails or slide surfaces. Further, the curved portion 29 does not require the use of any upper guide rails for maintaining the belt in the desired curvature, so that there is thus no wear of the upper belt surface. The desired curvature of the belt in the upper reach thereof is easily maintained solely due to the proper driving engagement of the belt with the rollers 22 and 23, which driving engagement provides the desired curvature in the upper reach, which curvature is then maintained since the upper reach is relatively free of tension.

MODIFICATIONS

The mode of operation described above relative to conveyor 11 illustrated in FIGS. 1-4 involves a drive system wherein the end rollers 22 and 23 are simultaneously driven at equal peripheral speeds. However, it has been discovered that the operation of the conveyor 11 can be further improved by driving the lower end roller 22 at a peripheral speed which is slightly greater than the peripheral speed of the upper end roller 23. For example, by driving the lower end roller 22 at a slightly higher speed, there is created a small amount of slack in the upper belt reach 24 so that the desired curvature of the upper belt reach is continuously maintained. When the lower end roller 22 is driven at this slightly greater speed, then the drive between the rollers 22 and 23 and the belt 13 is preferably a friction drive since this permits a limited amount of slippage to occur between the belt and one of the end rollers, thereby tending to compensate for the differential in the driving speeds between the end rollers.

In this variation of the invention, the lower end roller 22 is preferably driven at a speed such that its peripheral velocity is in the order of 5 to 10 percent greater than the peripheral velocity of the upper end roller 23. This difference in driving speed can be achieved by causing a slight variation in the two drive trains which interconnect the motor 36 to the end rollers 22 and 23. For example, the driving sprockets 38 and 39 may be identical, but the driven sprocket 42 is preferably provided with a slightly larger diameter or number of teeth than the driven sprocket 44 associated with the upper end roller. For example, the driven sprocket 42 can be provided with 13 teeth, whereas the driven sprocket 44 can be provided with 12 teeth. This thus results in the lower end roller 22 being rotated at a slightly greater rate than the upper end roller 23. Alternately, the driven sprockets 42 and 44 can be identical, in which case the driving sprockets 38 and 39 are slightly different so as to achieve the desired speed differential between the upper and lower end rollers. It will be appreciated that numerous variations could be made either in the diameter of the rollers themselves or in the driving and driven sprockets so as to achieve the desired speed differential between the upper and lower rollers.

Figure 5:
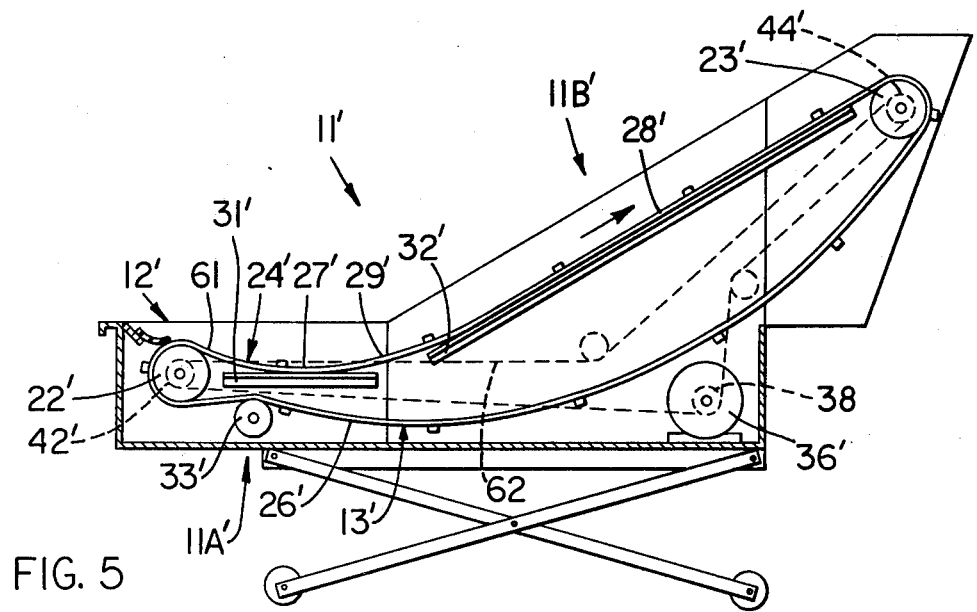
FIG. 5 is a side sectional view similar to FIG. 2 but illustrating a preferred variation of the present invention.

FIG. 5 illustrates therein a modified conveyor 11' which incorporates the modifications described above. To simplify description of conveyor 11', the parts thereof which correspond to those of conveyor 11 (FIGS. 1-4) have been designated by the same reference numerals but with the addition of a prime (') thereto.

As illustrated in FIG. 5, the end roller 22' is positioned at a higher elevation within the housing and, in fact, is preferably disposed so that the rotational axis of this roller is within a horizontal plane which substantially defines the upper guide surfaces of the guide rails 31'. The upper belt reach 24', within the horizontal section of the conveyor, thus effectively defines a pocket or cavity due to the slack in the belt. The upper belt reach includes not only the inclined portion 28' and the intermediate curved portion 29', but also includes a further curved portion 61 which extends outwardly and downwardly from the roller 22' to a position adjacent the guide rail 31'. The curved belt portions 61 and 29', together with whatever length of horizontal belt portion 27' is supported on the guide rail 31', thus effectively define an upwardly opening pocket, the sides of which are closed by the housing sidewalls.

To maintain the above-described pocket within the upper reach of the belt, the lower end roller 22' is provided with a greater length of circumferential frictional engagement with the belt so as to result in substantially slip-free engagement between the belt and the roller 22'. On the other hand, the upper roller 23' is preferably driven at a velocity slightly less than that of the roller 22' or, in the alternative, a smaller area of driving engagement exists between the roller 23' and the belt so as to permit limited slippage therebetween. In this manner, the pocket formed in the upper belt reach adjacent the roller 22' is thus continuously maintained to insure that the upper belt reach is substantially free of driving tension during operation of the conveyor.

Each of the rollers 22' and 23' are driven from the drive motor 36' by means of a power transmission mechanism which includes a first part drivingly connecting the motor to roller 22', and a second part drivingly connecting the motor to the roller 23'. This power transmission mechanism, in the illustrated embodiment, comprises a single endless chain 62 which insures positive driving of both rollers from the motor. This chain passes over and drivingly engages the driving sprockets 42' and 44' associated with the respective rollers 22' and 23', and is also disposed in driving engagement with a sprocket 38' secured to the motor shaft.

The formation of a pocket within the upper belt reach, as described above, is highly desirable since not only does this insure that the upper belt reach remains substantially free of tension and hence properly tracks and slidably engages the guide rail 32', but this pocket also greatly facilitates the depositing of parts or articles on the conveyor. For example, in many instances the parts can be deposited from some other machine directly into the pocket, whereupon the parts are then automatically transported upwardly through the inclined conveyor portion 11B' for discharge at the upper end thereof to any suitable device or apparatus.

By forming a pocket in the upper belt reach adjacent the lower roller 22', and by shortening the horizontal conveyor section 11A' (as illustrated in FIG. 5), it will be apparent that a situation can be reached where the curved belt sections 61 and 29' will merge together and thus not be spaced apart by an intermediate horizontal belt portion 27'. In this instance, the inclined belt section 28' will thus terminate at the lower inlet end thereof solely in a curved belt section (defined by belt portions 61 and 29') forming an article receiving pocket. With such a modification, it will be apparent that the horizontal guide rails 31' can be totally eliminated, provided that the articles deposited on the conveyor belt are of rather light weight, since the mere suspension of the curved portion of the belt will be sufficient to maintain the desired and necessary curvature.

If desired or necessary, a spring-urged roller (not shown) can be movably mounted on the frame directly opposite the end roller 22' so as to resiliently engage the belt therebetween, thus insuring a substantially slip-free engagement of the belt with the roller 22'. This thus positively insures that slack is created in the upper belt reach to result in formation of the pocket, and thereby prevent tensioning of the upper belt reach. The use of such a spring-urged roller is particularly desirable in instances where the upper and lower end rollers are driven at the same peripheral speed, since this would substantially eliminate any possible slippage between the belt and the lower roller.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a belt conveyor having a housing, first and second elongated rollers supported on said housing for rotation about substantially parallel horizontal axes, an endless flat belt supported on and extending between said rollers, said belt being of substantial width and having an outer surface adapted to support articles thereon as they are being moved by said conveyor, and a drive device interconnected to one of said rollers for moving said belt, comprising the improvement wherein:
   said second roller is displaced horizontally from and vertically above said first roller;
   said belt having a non-straight upper reach which extends between said first and second rollers, said upper reach including first and second elongated belt portions which extend at a substantial angle with respect to one another, said first belt portion being positioned adjacent said first roller and extending outwardly therefrom in a direction which is generally toward said second roller, said second belt portion being positioned adjacent said second roller and extending outwardly and downwardly therefrom in a direction which is generally toward said first roller, said second belt portion being substantially straight and inclined downwardly at a substantial angle with respect to the horizontal as it extends away from said second roller, and a curved belt portion interconnected between said first and second belt portions;
   guide means mounted on said housing and disposed for guidably supporting the upper reach of said belt as it extends between said first and second rollers, said guide means engaging the undersurface of said upper reach so that as it extends between said first and second rollers it is supported solely by the guidable engagement of the undersurface thereof with said guide means;
   said drive device causing simultaneous rotation of said first and second rollers in the same rotational direction for causing movement of the upper reach of said belt in a direction from said first roller toward said second roller so that articles supported on said upper reach are moved upwardly by said second belt portion; and
   said drive device including a common drive motor, a power train drivingly connected between said motor and said second roller for causing rotation thereof at a selected peripheral speed, and said power train being drivingly connected between said motor and said first roller for causing rotation thereof at a peripheral speed which is at least equal to said selected peripheral speed, said power train comprising a positive drive-type endless driving member means extending between and drivingly connected to said motor and both of said first and second rollers, whereby the upper belt reach is substantially free of tension and is maintained in a desired non-straight configuration due to said upper reach being supported solely by said first and second rollers and said guide means so that said upper belt reach does not require the use of any guiding structure disposed in engagement with the upper surface thereof.

2. A conveyor according to claim 1, wherein said first belt portion slopes downwardly as it extends outwardly from said first roller in a direction generally toward said second roller, said first and curved belt portions cooperating to define a generally upwardly opening pocket for receiving therein articles which are deposited on said conveyor.

3. A conveyor according to claim 2, wherein said power train causes said first roller to be rotatably driven at a peripheral velocity which is slightly greater than said peripheral speed.

4. A conveyor according to claim 2, wherein said housing includes opposed sidewalls which are positioned closely adjacent the opposite side edges of said upper belt reach, said sidewalls being disposed adjacent and projecting upwardly above said first and curved belt portions for effectively closing the sides of the pocket created by said first and curved belt portions.

5. A conveyor according to claim 4, wherein said power train causes said first roller to be rotatably driven at a peripheral velocity which is slightly greater than said peripheral speed.

6. A conveyor according to claim 1, wherein said guide means includes a first elongated guide rail fixedly associated with said housing and projecting substantially horizontally away from said first roller so that at least a part of said first belt portion is slidably supported on said first guide and extends substantially horizontally, said first guide having a surface which slidably engages the underside of said first belt portion, said surface defining a substantially horizontally extending plane which is disposed at an elevation substantially below the uppermost point on the periphery of said first roller, whereby said first belt portion includes a curved part which extends between said first guide and the periphery of said first roller, said curved part extending outwardly and downwardly as it projects from a point of engagement with said first roller to a point of engagement with said first guide, said guide means including a second elongated guide which is substantially planar and is fixed with respect to said housing, said second guide extending outwardly and downwardly away from said second roller so as to be inclined with respect to the horizontal, said second guide having a guide surface thereon disposed in slidable supporting engagement with the undersurface of said second belt portion.

7. In a belt conveyor having a housing, first and second elongated rollers supported on said housing for rotation about substantially parallel horizontal axes, an endless flat belt supported on and extending between said rollers, said belt being of substantial width and having an outer surface adapted to support articles thereon as they are being moved by said conveyor, and a drive device interconnected to one of said rollers for moving said belt, comprising the improvement wherein:

said second roller is displaced horizontally from and vertically above said first roller;

said belt having an upper belt reach which extends between said first and second rollers, said upper belt reach including an elongated and substantially straight belt portion which extends outwardly from said second roller in a direction which is generally toward said first roller, said belt portion as it extends away from said second roller being inclined downwardly at a substantial angle with respect to the horizontal;

guide means mounted on said housing and disposed for guidably supporting the upper reach of said belt as it extends between said first and second rollers, and guide means engaging the undersurface of said upper reach so that as it extends between said first and second rollers it is supported solely by the guidable engagement of the undersurface thereof with said guide means, said upper belt reach as it extends between said first and second rollers having the upper surface thereof free of engagement with any guiding or supporting structure;

said upper belt reach also including an upwardly opening article-receiving belt portion which defines a pocketlike receptacle for permitting articles to be deposited therein, said article-receiving belt portion extending between said first roller and the lower end of said straight belt portion, said article-receiving belt portion including a first curved belt part which extends outwardly and downwardly away from the first roller and a second curved belt part which curves upwardly for connection to the lower end of the straight belt portion;

said drive device causing simultaneous rotation of said first and second rollers in the same rotational direction for causing movement of the upper reach of said belt in a direction from said first roller toward said second roller so that articles supported on said upper reach are moved upwardly by said belt as they are moved toward said second roller; and said drive device including a common drive motor and power train means drivingly connected between said motor and said first and second rollers for causing rotation thereof, said power train including positive drive-type endless driving member means extending between and drivingly connected to said motor and both of said first and second rollers for rotating said second roller at a preselected peripheral speed and rotating said first roller at a peripheral speed which is at least equal to said preselected peripheral speed, whereby the upper belt reach is substantially free of tension as it extends between said first and second rollers and is maintained in its desired configuration due to said upper belt reach being supported solely by said first and second rollers and said guide means engaging the undersurface of said upper reach.

8. A conveyor according to claim 7, wherein said endless driving member means includes a single endless member drivingly connected between said motor and both of said first and second rollers for rotating said first roller at a peripheral velocity which is slightly greater than said selected peripheral speed of said second roller.

* * * * *

UNITED STATES PATENT AND TRADEMARK OFFICE
CERTIFICATE OF CORRECTION

PATENT NO. : 4 171 044
DATED : October 16, 1979
INVENTOR(S) : John H. Rossio

It is certified that error appears in the above-identified patent and that said Letters Patent are hereby corrected as shown below:

Column 9, line 8; after "said", insert ---selected---.

Column 9, line 19; after "said", insert ---selected---.

Column 10, line 8; change "and" to ---said---.

Signed and Sealed this

Fifteenth Day of January 1980

[SEAL]

Attest:

SIDNEY A. DIAMOND

Attesting Officer

Commissioner of Patents and Trademarks